United States Patent [19]
Westall et al.

[11] 3,857,962
[45] Dec. 31, 1974

[54] FLAVOR PRESERVATION IN SUGARLESS CHEWING GUM COMPOSITIONS AND CANDY PRODUCTS

[75] Inventors: Edward B. Westall, San Jacinto, Calif.; James J. Scanlan, Hillsdale, N.J.; Miroslaw Sahaydak, Great Neck, N.Y.

[73] Assignee: Warner-Lambert Company, Morris Plains, N.J.

[22] Filed: Oct. 31, 1973

[21] Appl. No.: 411,568

Related U.S. Application Data

[63] Continuation-in-part of Ser. No. 189,374, Oct. 14, 1971, Pat. No. 3,821,417, which is a continuation-in-part of Ser. No. 88,144, Nov. 9, 1970, abandoned.

[52] U.S. Cl............... 426/3, 426/223, 426/328, 426/214
[51] Int. Cl............... A23g 3/00, A23g 3/30
[58] Field of Search........... 426/328, 3, 4, 5, 6, 214, 426/223

[56] References Cited
UNITED STATES PATENTS

| | | | |
|---|---|---|---|
| 3,087,821 | 4/1963 | Horowitz et al. | 426/217 |
| 3,522,236 | 7/1970 | Krbechek | 426/217 |
| 3,625,700 | 12/1971 | Krbechek | 426/3 |

Primary Examiner—Samih N. Zaharna
Assistant Examiner—J. M. Hunter
Attorney, Agent, or Firm—Albert H. Graddis; Frank S. Chow; Anne M. Kelly

[57] ABSTRACT

Dihydrochalcone glycoside monosalts, alone or in combination have been found to modify deterioration of essential oil flavors in sugarless chewing gum compositions and in sugarless candy products, when incorporated at concentrations of at least 0.0025% by weight, based on the weight of the total formulation. In addition, these dihydrochalcone glycoside monosalt preservatives prolong flavor qualities during the chewing of gum compositions. The monocalcium salt of dihydrochalcone glycosides has been found to be particularly effective.

40 Claims, No Drawings

FLAVOR PRESERVATION IN SUGARLESS CHEWING GUM COMPOSITIONS AND CANDY PRODUCTS

CROSS REFERENCE TO RELATED APPLICATION

This application is a continuation-in-part of our copending application, U.S. Ser. No. 189,374, filed Oct. 14, 1971, now U.S. Pat. No. 3,821,417, which is, in turn a continuation-in-part of our application U.S. Ser. No. 88,144, filed Nov. 9, 1970, now abandoned.

BACKGROUND OF THE INVENTION

Cold pressed and concentrated essential oils, widely used as flavoring materials, are subject to flavor deterioration resulting from the action of heat, light, air and moisture. These essential oil flavors are known to oxidize when stored in the presence of air and moisture. During this deterioration process, terpene compounds, which have very unpleasant odors and tastes, are formed and the oxidized oils are therefore no longer satisfactory for use in flavoring.

Similar hazards are encountered when products formulated to contain essential oil flavors are manufactured, shipped, and stored. Even though every effort is made to guard against deterioration of flavor oils during the manufacture and shipping of products containing these oils, once the products are marketed and in the hands of the consumer, little can be done to prevent the development of off-flavors.

In addition to the above mentioned deterioration problems, conventional chewing gum compositions are also subject to dissipation of flavor before the end of the "chewing" life normally associated with the gum. Thus, while gum compositions are usually considered "chewable" for hours, the flavor is often dissipated in a considerably shorter period, for example, in a period of from about 3 to 5 minutes. Obviously, depending upon the particular gum formulation and the flavors in use, variations in the time that the flavor endures, while the gum is being chewed, will occur. In general, however, no formulation and/or flavor is known which maintains fully a distinctive taste characteristic in the oral cavity during the useful life of a chewing gum.

Many methods have been devised in the past to improve the flavor quality of gum compositions and candy products. Attempts have been made to prevent deterioration of flavor, as in U.S. Pat. No. 2,891,868, by using enzyme deoxygenators, such as glucose oxidase with a glucose substrate and catalase, to maintain flavor quality in chewing gum. U.S. Pat. No. 3,205,075 teaches the protection of sensitive flavors by coating them with a sugar shell prior to incorporation into chewing gum; more than one flavor can be treated in this manner to provide a multiflavor slab chewing gum in which the flavor ingredient is not only protected but released into the oral cavity in a controlled manner.

Other methods for preventing deterioration of flavor oils involve the addition of antioxidants to the formulated product. For example, in U.S. Pat. No. 2,869,895 and in U.S. Pat. No. 3,041,180, the formulation of a solid particulate emulsion containing a flavor oil and an antioxidant provides both flavor protection and controlled release when added to dehydrated beverage products.

In addition, a series of patents, U.S. Pat. No. 2,886,422 — U.S. Pat. No. 2,886,445, and U.S. Pat. No. 2,886,447 — U.S. Pat. No. 2,886,449, teach the encapsulation of volatile, water-immiscible flavoring oils in a gelatin material to provide the controlled release of flavor in gum products.

While these and other similar prior art methods for preserving and prolonging flavor qualities in chewing gum compositions and other candy products have been relatively effective, such methods do require special manufacturing techniques and procedures, and are therefore unattractive. Thus, an effective method for preserving and prolonging flavor in chewing gum and candy products containing essential oil flavoring materials, which does not entail extensive revision of usual manufacturing facilities, has not yet been developed.

SUMMARY OF THE INVENTION

Flavor quality in sugarless chewing gum or sugarless candy products containing essential oil flavoring materials is preserved and prolonged by the addition of 0.0025 to 0.5 percent by weight, based on the weight of the total formulation, of at least one dihydrochalcone glycoside monosalt preserving and prolonging agent of the type herein described. Products containing the dihydrochalcone glycoside monosalt preserving and prolonging agents can be stored for extended periods of time without usual adverse effects of flavor deterioration.

DESCRIPTION OF THE INVENTION

In carrying out the present invention, monosalts of dihydrochalcone glycosides have the Formula I below:

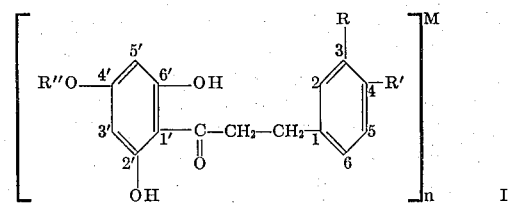

wherein R represents a radical selected from the group consisting of hydrogen and hydroxy; R' represents a radical selected from the group consisting of hydrogen, hydroxy, and 1 to 3 carbon alkoxy; and R'' represents a glycoside residue selected from the group $\beta$-rutinosyl, neohesperidosyl, and $\beta$-D-glycosyl; M is a mono- or divalent metal selected from the group consisting of an alkali metal and an alkaline earth metal, and $n$ is an integer from 1 to 2 corresponding to the valence of the selected metal M; are added to sugarless chewing gum and sugarless candy compositions containing essential oil flavoring materials to preserve flavor quality for extended periods of time.

The dihydrochalcone glycoside monosalts used in the sugarless gum and candy compositions of this invention have only one of the free phenolic hydroxy groups originally present in the dihydrochalcone glycoside free base taking part in salt formation reaction. Where an alkali metal salt is formed, the resulting compound will be a monosodium, monopotassium, and the like, salt. Where the alkaline earth metal is involved, 2 moles of the dihydrochalcone glycoside compound react, with only 1 of the phenolic hydroxyls in each mole undergoing salt formation.

Among the metal salts which are suitable for preparing the dihydrochalcone glycoside monosalt flavor preserving and prolonging agents, there may be mentioned sodium, potassium, calcium, and ammonium salts. The monosalt derivatives are characterized by a higher degree of solubility than the free bases from which they are formed.

In the above Formula I, the R'' substituents, β-rutinosyl, β-neohesperidosyl and β-D-glucosyl have the following structures:

β-Rutinosyl (II) which may also be named as 6-0-α-L-rhamnosyl -β-D-glucosyl:

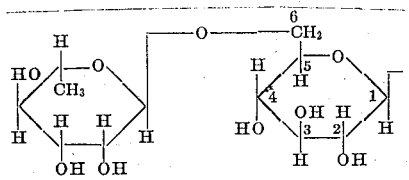

II

β-Neohesperidosyl (III): which may also be named as 2-0-α-L-rhamosyl-β-D-glucosyl:

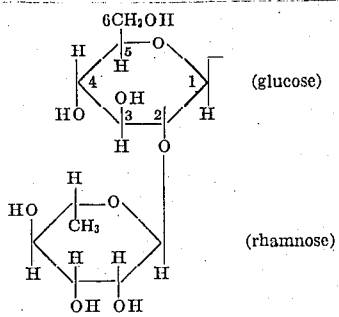

III

β-D-glucosyl (IV):

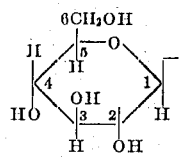

IV

Representative dihydrochalcone glycoside free bases from which the monosalts having Formula I are formed, include the following:

Neohesperidin dihydrochalcone or 2',3,6'-trihydroxy-4-methoxy-4'-neohesperidosyloxydihydrochalcone:
  R = hydroxy at the 3 position
  R' = methoxy at the 4 position
  R'' = neohesperidosyl radical at the 4' position
2',3,6'-trihydroxy-4-ethoxy-4'-neohesperidosyloxydihydrochalcone:
  R = hydroxy at the 3 position
  R' = ethoxy at the 4 position
  R'' = neohesperidosyl radical at the 4'-position
2',3,6'-trihydroxy-4-propoxy-4'-neohesperidosyloxydihydrochalcone:
  R = hydroxy at the 3 position
  R' = propoxy at the 4 position
  R'' = neohesperidosyl radical at the 4'-position
2',3,6'-trihydroxy-4'-neohesperidosyloxydihydrochalcone:
  R = hydroxy at the 3 position
  R' = hydrogen at the 4 position
  R'' = neohesperidosyl radical at the 4' position
Naringin dihydrochalcone or 2',4,6'-trihydroxy-4'-neohesperidosyloxydihydrochalcone:
  R = hydrogen at the 3 position
  R' = hydroxy at the 4 position
  R'' = neohesperidosyl radical at the 4' position
Eriodictyol 7-neohesperidoside dihydrochalcone or 2',3,4,6'-tetrahydroxy-4'-neohesperidosyloxydihydrochalcone:
  R = hydroxy at the 3 position
  R' = hydroxy at the 4 position
  R'' = neohesperidosyl at the 4' position
Homoeriodictyol 7-neohesperidoside dihydrochalcone or 2',4,6'-trihydroxy-3-methoxy-4'-neohesperidosyloxydihydrochalcone:
  R = methoxy at the 3 position
  R' = hydroxy at the 4 position
  R'' = neohesperidosyl dihydrochalcone at the 4' position
Prunin dihydrochalcone or 2',4,6'-trihydroxy-4'-β-D-glucosyloxydihydrochalcone:
  R = hydrogen at the 3 position
  R' = hydroxy at the 4 position
  R'' = β-D-glucosyl radical at the 4' position
Hesperetin Dihydrochalcone Glucoside or 2',3,6'-trihydroxy-4-methoxy-4'-β-D-glucosyloxydihydrochalcone:
  R = hydroxy at the 3 position
  R' = methoxy at the 4 position
  R'' = β-D-glucosyl radical at the 4' position
Hesperidin Dihydrochalcone or 2',3,6'-trihydroxy-4-methoxy-4'-β-rutinosyloxydihydrochalcone:
  R = hydroxy at the 3-position
  R' = methoxy at the 4-position
  R'' = β-rutinosyl at the 4' position The dihydrochalcone glycoside free bases described above and the method for their preparation are disclosed in U.S. Pat. No. 3,087,821. In general, the free base dihydrochalcone glycosides are prepared from the corresponding flavanone glycosides by known methods, involving, for example, the conversion of the flavanone glycosides to the corresponding chalcone, followed by the reduction of this intermediate to the dihydrochalcone glycoside. In particular, hesperetin dihydrochalcone glucoside may be prepared from hesperidin according to the process described in U.S. Pat. No. 3,583,894.

Additionally, in J. Agr. Food Chem. 16: 108–112 (1968), Krbechek et al. describe the preparation of a variety of dihydrochalcones from naringin: naringin is converted into phloracetaphenone 4'-β-neohesperidoside, which is then reacted with appropriate benzaldehydes to yield a series of chalcones; these are either hydrogenated to the dihydrochalcones or cyclized to the corresponding flavones, which are, in turn, converted to their respective dihydrochalcones. Proper reaction conditions provide good yields of dihydrochalcones in relatively short periods of time.

In U.S. Pat. No. 3,522,236, the 2',4',6',3-tetrahydroxy-4-n-propoxydihydrochalcone 4'-β-neohesperidoside (also named as 2',3,6'-trihydroxy-4-propoxy-4'-neohesperidosyloxydihydrochalcone) is described as being a water soluble compound of intense sweetness suitable for providing low caloric sweetening to edible materials including fruits, vegetables, meats, cereals, beverages, pastries, candies, desserts, chewing gums, toothpastes, mouth rinses, tobacco products and the like.

The monosalts of above-mentioned dihydrochalcone glycoside free bases and their preparation are described and claimed in copending application, U.S. Ser. No. 143,632, filed May 14, 1971. According to the general method of preparation, an alkali metal or an alkaline earth metal hydroxide, oxide or salt is reacted with the desired dihydrochalcone glycoside in an aqueous medium in a molar ratio of 1 mole of alkali metal compound to 1 mole of the dihydrochalcone; in the case of the alkaline earth metal compounds, 0.5 mole of alkaline earth metal to 1 mole of dihydrochalcone glycoside compound is used. For the alkali metal reactants, the hydroxide is preferably employed; however, since alkaline earth metals are less soluble, the hydroxide may be introduced in the form of an aqueous suspension. The dihydrochalcone glycoside salt reaction product obtained has only one of the free phenolic hydroxyl groups of the original dihydrochalcone glycoside compound reacted in the salt formation.

Monosalts of dihydrochalcone glycosides having the following configuration have been found to be particularly effective in preserving and prolonging flavors:

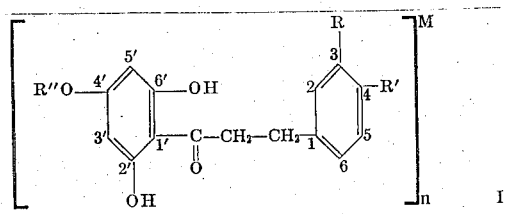

wherein R represents a radical selected from the group consisting of hydrogen and hydroxy; R' represents a radical selected from the group consisting of hydroxy and 1 to 3 carbon alkoxy; and R'' represents a glycoside residue selected from the group consisting of neohesperidosyl and β-D-glucosyl; and M is a mono- or divalent metal selected from the group consisting of an alkali metal and an alkaline earth metal, and n is an integer from 1 to 2 corresponding to the valence of the selected metal M.

The particularly preferred monosalt dihydrochalcone glycosides used in the sugarless compositions of this invention are calcium di(neohesperidin dihydrochalcone) and calcium di(naringin dihydrochalcone), pictured below in Formulas V and VI:

Calcium Di(neohesperidin Dihydrochalcone):

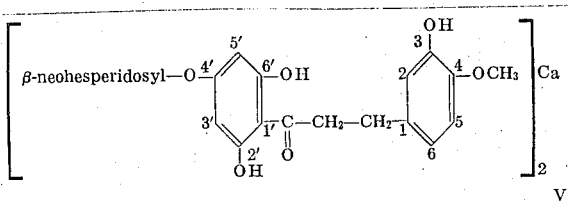

V

Calcium Di(naringin Dihydrochalcone):

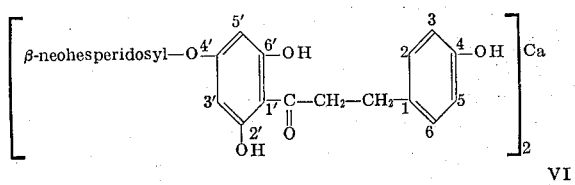

VI

In the practice of this invention, preservation and prolongation of essential oil flavors in sugarless gum and sugarless candy compositions may be achieved by using a single dihydrochalcone glycoside monosalt or a mixture of two or more dihydrochalcone glycoside monosalts. Optionally, a dihydrochalcone glycoside free base may also be added to sugarless gums and sugarless candy compositions, according to the teachings of this invention, and can be present together with the dihydrochalcone glycoside monosalt. The quantity of dihydrochalcone glycoside monosalt(s) used is variable. However, in all cases, at least about 0.0025 percent by weight of a dihydrochalcone glycoside monosalt, based on the weight of the total flavored formulation, should be present to achieve preservation and prolongation of flavor. Obviously, substantially greater quantities can be employed, if desired or if necessary to produce a particular effect. In general, however, rarely will it be necessary to incorporate into the sugarless formulation more than 0.5 percent by weight of the dihydrochalcone glycoside monosalt or a mixture of several dihydrochalcone glycoside monosalts. Thus, in its broadest embodiment, a flavor-stabilized sugarless composition of this invention will contain from about 0.0025 to about 0.5 percent by weight of the dihydrochalcone glycoside monosalt flavor preserving and prolonging agent, or from 0.0025 to 0.5 percent by weight of a mixture of several dihydrochalcone glycoside monosalts. Certain of the preferred sugarless compositions will contain from about 0.01 to about 0.15 percent by weight of the dihydrochalcone glycoside monosalt(s).

Essential oil flavoring materials used in the sugarless chewing gum compositions and sugarless candy products which are preserved and/or prolonged by the addition of the dihydrochalcone glycoside monosalt(s) according to this invention include those volatile oils having a characteristic odor which are distilled from plants, leaves, flowers, etc. Representative flavor oils of this type include citrus and mint oils such as lemon oil, orange oil, lime oil, grapefruit oil; fruit essences such as apple essence, pear essence, peach essence, strawberry essence, apricot essence, raspberry essence, cherry essence, plum essence, pineapple essence and the like; peppermint oil, spearmint oil, clove oil, bay oil, anise oil, eucalyptus oil, thyme oil, cedar leaf oil, cinnamon oil, oil of nutmeg, oil of sage, oil of bitter almonds, cassia oil, and methylsalicylate (oil of wintergreen). Certain synthetic flavor materials, also subject to deterioration, may be preserved through the use of dihydrochalcone preservatives of the instant invention, in much the same manner as the natural flavoring materials are modified.

Among the above mentioned flavor oils, those which have been found to be particularly benefited by combination with the dihydrochalcone glycoside monosalt(s) according to this invention include peppermint oil, orange oil, lemon oil, and grapefruit oil. Problems with the development of off-flavors in peppermint are most severe. For this reason, products flavored with peppermint to which the dihydrochalcone glycoside monosalt(s) have been added show exceptionally superior storage life and high quality of flavor.

The sugarless candy products to which the dihydrochalcone glycoside monosalt(s) of this invention may be added to modify the effects of deterioration of flavor ingredients include the compressed or pressed candy varieties. For products of this type (which usually contain powdered sorbital instead of sugar) synthetic sweeteners, if desired, are mixed with the powdered sorbitol, and flavor(s), colorant(s) and a tablet lubricant are then added. The formula is introduced into a tablet machine to shape the final product. A typical sugarless pressed candy may contain the following ingredients, in percent by weight, based on the weight of the total formulation:

98% to 99.5% sorbitol
0.1% to 0.9% flavor(s)
0% to 0.02% synthetic sweeteners
0% to .03% colorant(s)
0.05% to 1.% tableting lubricant Obviously, many variations of the above described formulation and procedure may be used to prepare sugarless candies. One such variation, particularly preferred for use with the dihydrochalcone glycoside monosalt preserving agents of this invention, contains 96 to 99.5 percent by weight sorbitol; 0.1 to 1 percent flavor(s); 0 to 0.2 percent synthetic sweetener(s); 0 to 0.03 percent colorant(s); and 0.05 to 2 percent tableting lubricant (all percentages based on the total weight of the formulation). In a most preferred sugarless candy composition, from 0.3 to 0.8 percent by weight flavor(s) and from 0.009 to 0.02 percent by weight synthetic sweetener(s) are present. With all of the various sugarless candy products, the dihydrochalcone glycoside monosalt preserving and prolonging agents may be added to the formulation in order to modify deterioration of flavor quality, according to the teachings of this invention.

The dihydrochalcone glycoside monosalt flavor preserving agents of the present invention are particularly effective in sugarless chewing gum compositions, since they not only preserve flavor quality, but also prolong the life of the flavor throughout the chewing of the gum.

While substantial variations therein are possible, a typical sugarless chewing gum may contain the following ingredients, in percent by weight, based on the weight of the total formulation:

| Ingredients | Weight Percent |
| --- | --- |
| gum base | from about 10% to about 50% |
| binder | from about 3% to about 20% |
| filler (sorbitol, mannitol or combinations thereof) | from about 5% to about 80% |
| artificial sweetener and flavor | from about 0.1% to about 5% |

In certain sugarless gums, there is used as the binder ingredient, a solution of sorbitol in water containing from about 10 to about 80 percent, preferably from about 60 to about 75 percent by weight of sorbitol in water. In others there is used a gum acacia-in-water system containing from about 30 to about 60 percent, preferably from about 45 to about 50 percent, by weight of gum acacia powder.

A particularly preferred sugarless chewing gum formulation for use with the dihydrochalcone glycoside monosalt flavor preserving and prolonging agents according to this invention, contains from 0.4 to 2.0 percent by weight, based on the total weight of the formulation of flavor(s) and from 0 to 0.5 percent by weight synthetic sweetener. A most preferred sugarless gum composition contains from 0.5 to 1.5 percent by weight flavor and from 0.1 to 0.25 percent by weight synthetic sweetener.

The above sugarless chewing gum formulations are exemplary only. Many addtitional formulations are described in the prior art and, in carrying out this invention, such formulations can be employed.

The ingredient, referred to heretofore in the formulations simply as "gum base" is also susceptible to many variations. In general, a gum base is prepared by heating and blending various ingredients, such as, natural gums, synthetic resins, waxes, plasticizers, etc., in a manner well known in the art. Typical examples of the ingredients found in a chewing gum base are masticatory substances of vegetable origin, such as chicle, crown gum, nispero, rosidinha, jelutong, pendare, perillo, niger gutta, tunu, etc.; masticatory substances of synthetic origin, such as, butadienestyrene polymer, isobutylene-isoprene copolymer, paraffin, petroleum wax, polyethylene, polyisobutylene, polyvinylacetate, etc.; plasticizers, such as, lanolin, stearic acid, sodium stearate, potassium stearate, etc.; antioxidants, such as, butylated hydroxyanisole, butylated hydroxytoluene, and propyl gallate.

It is possible to prepare an acceptable sugarless chewing gum or candy composition as described above, containing only flavor(s) and at least 0.0025 percent by weight of at least one flavor preserving and prolonging dihydrochalcone glycoside monosalt, or mixtures of said glycoside salts. In such gum and candy compositions, the sorbitol or mannitol ingredient which serves as a filler or binding agent in the formulation, has some sweetening qualities and no additional "synthetic sweetener" is required. In other sugarless gum and candy compositions, however, synthetic sweetener(s), flavor(s) and the flavor preserving and prolonging dihydrochalcone glycoside monosalts are preferred in order to achieve optimum taste qualities. Representative synthetic sweeteners (other than the known sweet-tasting polyols, sorbitol and mannitol) which may be added to such gum and candy compositions include saccharin, sodium saccharin, calcium saccharin, sodium cyclamate, calcium cyclamate, cyclamic acid, dihydrochalcones, glycyrrhizin, glycyrrhizic acid ammonium salt, L-aspartyl-L-phenylalanine (methyl ester), *Stevia rebaudiana* (Stevioside), *Richardella dulcifica* (Miracle Berry), *Dioscoreophyllum cumminsii* (Serendipity Berry), and the like. This list is not intended to be all inclusive. Obviously, other synthetic sweeteners and newly developed sugar substitutes could be used in sugarless gums and candy compositions, in conjunction with the flavor preserving and prolonging dihydrochalcone, according to the teachings of this invention.

The manner in which the dihydrochalcone glycoside monosalt flavor preserving and prolonging agents are incorporated into the sugarless chewing gum composition or candy products is not critical and will be readily apparent to persons skilled in the art. For candy products, the dihydrochalcone glycoside monosalt(s) preserving agents are preferably added along with the flavor(s) during formulating. For chewing gum compositions, a variety of procedures may be followed. For example, the dihydrochalcone glycoside monosalts of the mixture of several dihydrochalcone glycoside monosalts can be added to, and blended in, the chewing gum base prior to the admixture of the base with the other ingredients in the formulation. In the alternative, the dihydrochalcone glycoside monosalt(s) can be dissolved in a suitable solvent, for example, water, aqueous ethyl alcohol or those flavors which are suitable as solvents for the dihydrochalcone glycoside monosalts. The solution thus obtained, is blended with the remaining ingredients of the chewing gum formulation. If desired, the flavor component can be added to the solution of the dihydrochalcone glycoside monosalt prior to the formulation of that solution with the other chewing gum ingredients. The preferred procedure is to dissolve the dihydrochalcone glycoside monosalt or a mixture of several dihydrochalcone glycoside salts in an aqueous solution prior to use. The quantity of water used in producing the solution is not critical, the objectives of the invention being achieved by the use of an amount of water sufficient to dissolve the dihydrochalcone glycoside monosalt(s).

The present invention produces a significant advance in the art. It furnishes an efficient and practical method for preserving essential oil flavor(s) in sugarless chewing gum compositions and sugarless candy products and makes possible storage of such products for periods of time theretofore impossible.

A further advantage of the dihydrochalcone glycoside monosalt preserving and prolonging agents of this invention is that, in some cases, it has been found possible to employ essential oils of a cruder cut (i.e., those which have not been subjected to repeated purification processes) to obtain products having superior flavors. Without the addition of the dihydrochalcone glycoside monosalt flavor preserving and prolonging agents to products flavored with a crude cut of essential oils, flavor quality is low and off-flavors develop rapidly.

The mechanism by which the dihydrochalcone glycoside monosalts perform this preserving and prolonging function is not entirely understood. Certainly, the prior art does not suggest that such activity could be expected: Inglett, E. G., et al., in *Journal of Food Science*, Vol. 34: 101–103 (1969), attribute only sweetening properties to certain dihydrochalcone glycoside free bases. Some dihydrochalcone compounds have been reported to be intensely sweet, making them potentially valuable as synthetic sweeteners. Combinations of the dihydrochalcones with commercially used synthetic sweeteners have been found to impart good taste qualities in soft drink products. Synergism does not appear to be a factor, according to the results obtained in these prior art studies.

No mention is made in prior art dihydrochalcone literature of the formation of salt derivatives, and specifically of the formation of the dihydrochalcone glycoside "monosalt" derivatives found to be especially useful in the sugarless compositions of this invention. Thus, it is totally unexpected that a dihydrochalcone glycoside monosalt or mixtures of several dihydrochalcone glycoside monosalts, are able to modify the deterioration of essential oil flavor ingredients in sugarless candy and gum products, and in addition, to prolong flavor in sugarless gum throughout its normal "chewing life."

For a fuller understanding of the nature and objects of this invention, reference may be had to the following examples which are given merely as further illustration of the invention and are not to be construed in a limiting sense.

EXAMPLE 1

Sugarless Gum Composition Containing Calcium Di(Neohesperidin Dihydrochalcone), Flavored with Oil of Peppermint.

A gum composition is prepared containing the following ingredients in the quantities specified: Gum base 28 grams; Gum acacia solution (45% aqueous) 6 grams; Gum acacia powder 3 grams; Mannitol 26 grams; Sorbitol 35.45 grams; Stevioside 0.1 grams; Calcium Di(neohesperidin dihydrochalcone) 0.04 grams; Water 0.41 grams; and Oil of Peppermint 1 gram.

In preparing this composition, the calcium di(-neohesperidin dihydrochalcone) is dissolved in water, added to the gum acacia-in-water solution and both are blended with the gum base; next, the gum acacia powder, mannitol and sorbitol ingredients are added and mixed to obtain a uniform blend. The Stevioside sweetener is then added and thoroughly blended into the mixture. Lastly, the oil of peppermint is incorporated into the blend and thoroughly mixed. The gum product is then rolled, scored, conditioned and wrapped in the usual manner.

EXAMPLE 2

Sugarless Gum Composition Containing Calcium Di(Naringin Dihydrochalcone) Flavored with Oil of Peppermint.

A sugarless chewing gum is prepared as in Example 1 using an aqueous solution of 0.04 grams of calcium di(naringin dihydrochalcone) which is added to the gum acacia-in-water solution and blended with the gum batch according to the method described in Example 1, then further processed as described in Example 1.

EXAMPLE 3

Sugarless Gum Composition Containing Mono-Sodium Neohesperidin Dihydrochalcone, Flavored with Oil of Peppermint.

A sugarless gum composition is prepared as in Example 1, using an aqueous solution of 0.04 grams of monosodium neohesperidin dihydrochalcone, which is added to the gum acacia-in-water solution and blended with the gum batch according to the method described in Example 1, then further processed as described in Example 1.

EXAMPLE 4

Sugarless Gum Composition Containing Calcium Di(Neohesperidin Dihydrochalcone) and Calcium Di(Naringin Dihydrochalcone) Flavored with Oil of Spearmint.

A sugarless chewing gum composition is prepared as in Example 1 using an aqueous solution of 0.02 grams of calcium di(neohesperidin dihydrochalcone) and 0.02 grams of calcium di(naringin dihydrochalcone) which is added to the gum acacia-in-water solution and blended with the gum batch. As the sweetener 0.1 gram of L-aspartyl-L-phenylalanine methyl ester is used (instead of Stevioside in Example 1). Oil of spearmint flavor (1 gram) is added as the last ingredient and thoroughly blended with all other ingredients in the gum composition according to the method described in Example 1, then further processed as described in Example 1.

EXAMPLE 5

Sugarless Gum Composition Containing Calcium Di(Neohesperidin Dihydrochalcone), Flavored with Oil of Spearmint.

A gum composition is prepared containing the following ingredients in the quantities specified: Gum base 28 grams; Gum acacia solution (45% aqueous) 6 grams; Gum acacia powder 3 grams; Mannitol 26 grams; Sorbitol 35.52 grams; Calcium Di(neohesperidin Dihydrochalcone) 0.04 grams; Narington Dihydrochalcone 0.03 grams; Water 0.41 grams; and Oil of Spearmint 1 gram.

In preparing this composition, the calcium di(neohesperidin dihydrochalcone) is dissolved in water, added to the gum acacia-in-water solution and blended with the gum base; next, the gum acacia powder, mannitol and sorbitol ingredients are added and mixed to obtain a uniform blend. The naringin dihydrochalcone is dissolved ethyl alcohol, mixed with the oil of spearmint, incorporated into the blend, and thoroughly mixed. The gum product is then rolled, scored, conditioned and wrapped in the usual manner.

EXAMPLE 6

Sugarless Gum Composition Containing Monopotassium Naringin Dihydrochalcone, Flavored with Oil of Peppermint.

A gum composition is prepared containing the following ingredients in the quantities specified: Gum base 28 grams; Gum acacia solution (45% aqueous) 6 grams; Gum acacia powder 3 grams; Mannitol 26 grams; Sorbitol 35.55 grams; Monopotassium Naringin Dihydrochalcone 0.04 grams; Water 0.41 grams; and Oil of Peppermint 1 gram.

In preparing this composition, the monopotassium naringin dihydrochalcone is dissolved in water, added to the gum acacia-in-water solution, and blended with the gum base; next, the gum acacia powder, mannitol, and sorbitol ingredients are added and mixed to obtain a uniform blend. The oil of peppermint is then incorporated into the blend and thoroughly mixed. The gum product is then rolled, scored, conditioned and wrapped in the usual manner.

EXAMPLE 7

Sugarless Pressed Candy Composition Containing Calcium Di(Neohesperidin Dihdrochalcone), Flavored with Oil of Spearmint.

A pressed candy composition is prepared containing the following ingredients in the quantities specified: Sorbitol 97.721 grams; Oil of Spearmint 0.25 grams; Calcium Di(Neohesperidin Dihydrochalcone) 0.01 grams; Stevioside 0.019 grams; and Magnesium Stearate 2 grams.

All ingredients are added to the mixing kettle and mixed thoroughly. The final blend is pressed into tablets of approximately 50 psig hardness, each weighing 1.5 grams.

EXAMPLE 8

Sugarless Pressed Candy Composition Calcium Di(Naringin Dihydrochalcone), Flavored with Oil of Peppermint.

A pressed candy composition is prepared containing the following ingredients in the quantities specified: Sorbitol 97.621 grams; Oil of Peppermint 0.35 grams; Calcium Di(Naringin Dihydrochalcone) 0.01 grams; Stevioside 0.019 grams; and Magnesium Stearate 2 grams.

All ingredients are added to the mixing kettle and mixed thoroughly. The final blend is pressed into tablets of approximately 50 psig hardness, each weighing 1.5 grams.

EXAMPLE 9

Sugarless Pressed Candy Composition Containing Monosodium Neohesperidin Dihydrochalcone, Flavored with Oil of Peppermint.

A sugarless pressed candy composition is prepared as in Example 8, using 0.01 grams of monosodium neohesperidin dihydrochalcone as the dihydrochalcone ingredient. The final blend of ingredients is pressed into tablets as described in Example 8.

EXAMPLE 10

Sugarless Pressed Candy Composition Containing Calcium Di(Neohesperidin Dihydrochalcone) and Calcium Di(Naringin Dihydrochalcone), Flavored with Oil of Lemon.

A pressed candy composition is prepared containing the following ingredients in the quantities specified: Sorbitol 97.765 grams; Oil of Lemon 0.2 grams; Citric Acid 0.01 grams; Calcium Di(Neohesperidin Dihydrochalcone) .005 grams; Calcium Di(Naringin Dihydrochalcone) .005 grams; L-aspartyl-L-phenylalanine Methyl Ester 0.015 grams; Magnesium Stearate 2 grams.

All ingredients are added to the mixing kettle and mixed thoroughly. The final blend is pressed into tablets of approximately 50 psig hardness, each weighing 1.5 grams.

EXAMPLE 11

Sugarless Pressed Candy Composition Containing Calcium Di(Neohesperidin Dihydrochalcone) and Naringin Dihydrochalcone, Flavored with Oil of Peppermint.

A pressed candy composition is prepared containing the following ingredients in the quantities specified: Sorbitol 97.737 grams; Oil of Spearmint 0.25 grams; Calcium Di(Neohesperidin Dihydrochalcone) 0.01 grams; Naringin dihydrochalcone 0.003 grams; and Magnesium Stearate 2 grams.

All ingredients are added to the mixing kettle and mixed thoroughly. This final blend is pressed into tablets of approximately 50 psig hardness, each weighing 1.5 grams.

EXAMPLE 12

Sugarless Pressed Candy Composition Containing Monopotassium Naringin Dihydrochalcone, Flavored with Oil of Spearmint.

A pressed candy composition is prepared containing the following ingredients in the quantities specified: Sorbitol 97.74 grams; Oil of Spearmint 0.25 grams; Monopotassium Naringin dihydorchalcone 0.01 grams; and Magnesium Stearate 2 grams.

All ingredients are added to the mixing kettle and mixed thoroughly. This final blend is pressed into tablets of approximately 50 psig hardness, each weighing 1.5 grams.

We claim:

1. A sugarless chewing gum composition having preserved and prolonged flavor qualities comprises:
   A. From about 0 to about 0.5 percent by weight, based on the total weight of the formulation, of an artificial sweetener;
   B. From about 0.4 to about 2.0 percent by weight of a natural or synthetic essential oil flavor; and
   C. At least about 0.0025 percent by weight of at least one dihydrochalcone glycoside monosalt flavor preserving and prolonging agent having the Formula (I):

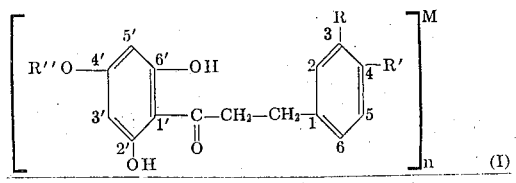

wherein R represents a radical selected from the group consisting of hydrogen and hydroxy; R' represents a radical selected from the group consisting of hydrogen, hydroxy and 1 to 3 carbon alkoxy; and R" represents a glycoside residue selected from the group consisting of β-rutinosyl, neohesperidosyl and β-D-glucosyl; and M is a mono- or divalent metal selected from the group consisting of an alkali metal and an alkaline earth metal, and n is an integer from 1 to 2 corresponding to the valence of the selected metal M.

2. A composition according to claim 1 wherein from about 0.1 percent by weight to about 0.25 percent by weight of the artificial sweetener is present; from about 0.5 percent by weight to about 1.5 percent by weight of the natural or synthetic essential oil flavor is present; and from about 0.0025 percent by weight to about 0.5 percent by weight of at least one dihydrochalcone glycoside monosalt flavor preserving and prolonging agent is present.

3. A composition according to claim 2 wherein from about 0.01 percent by weight to about 0.15 percent by weight of at least one dihydrochalcone glycoside monosalt flavor preserving and prolonging agent is present.

4. A composition according to claim 1 wherein, in Formula (I), R represents a radical selected from the group consisting of hydrogen and hydroxy; R' represents a radical selected from the group consisting of hydroxy and 1 to 3 carbon alkoxy; and R" represents a glycoside residue selected from the group consisting of neohesperidosyl and β-D-glucosyl.

5. A composition according to claim 1 wherein Formula (I) in (C), is the monocalcium salt of neohesperidin dihydrochalcone.

6. A composition according to claim 1 wherein Formula (I) in (C), is the monocalcium salt of naringin dihydrochalcone.

7. A composition according to claim 1 wherein Formula (I) in (C), is a combination of the monocalcium salt of neohesperidin dihydrochalcone with the monocalcium salt of naringin dihydrochalcone.

8. A composition according to claim 1 wherein Formula (I) in (C), is the monosodium salt of neohesperidin dihydrochalcone.

9. A composition according to claim 1 wherein Formula (I) in (C), is the monopotassium salt of naringin dihydrochalcone.

10. A composition according to claim 3 wherein the sugarless chewing gum contains from about 0.1 to about 0.25 percent by weight of L-aspartyl-L-phenylalanine methyl ester, from about 0.5 to about 1.5 percent by weight of an oil of peppermint flavor and from about 0.01 to about 0.15 percent by weight of the monocalcium salt of neohesperidin dihydrochalcone as a flavor preserving and prolonging agent.

11. A method for preserving and prolonging natural and synthetic essential oil flavors in sugarless chewing gum compositions containing from about 0 to about 0.5 percent by weight, based on the weight of the total formulation, of an artificial sweetener, and from about 0.4 to about 2.0 percent by weight of natural or synthetic essential oil flavor, which comprises incorporating therein at least about 0.0025 percent by weight of at least one dihydrochalcone glycoside monosalt flavor preserving and prolonging agent having the Formula (I):

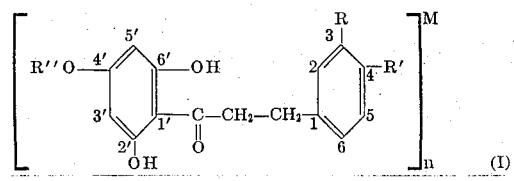

wherein R represents a radical selected from the group consisting of hydrogen and hydroxy; R' represents a radical selected from the group consisting of hydrogen, hydroxy and 1 to 3 carbon alkoxy; and R'' represents a glycoside residue selected from the group consisting of β-rutinosyl, neohesperidosyl and β-D-glucosyl; and M is a mono-or divalent metal selected from the group consisting of an alkali metal and an alkaline earth metal, and n is an integer from 1 to 2 corresponding to the valence of the selected metal M.

12. A method according to claim 11 wherein from about 0.1 percent by weight to about 0.25 percent by weight of the artificial sweetener is present; from about 0.5 percent by weight to about 1.5 percent by weight of the natural or synthetic essential oil flavor is present; and from about 0.0025 percent by weight to about 0.5 percent by weight of at least one dihydrochalcone glycoside monosalt flavor preserving and prolonging agent is present.

13. A method according to claim 12 wherein from about 0.01 percent by weight to about 0.15 percent by weight of at least one dihydrochalcone glycoside monosalt flavor preserving and prolonging agent is present.

14. A method according to claim 11 wherein, in Formula (I), R represents a radical selected from the group consisting of hydrogen and hydroxy; R' represents a radical selected from the group consisting of hydroxy and 1 to 3 carbon alkoxy; and R'' represents a glycoside residue selected from the group consisting of neohesperidosyl and β-D-glucosyl.

15. A method according to claim 11 wherein Formula (I) in (C), is the monocalcium salt of neohesperidin dihydrochalcone.

16. A method according to claim 11 wherein Formula (I) in (C), is the monocalcium salt of naringin dihydrochalcone.

17. A method according to claim 11 wherein Formula (I) in (C), is a combination of the monocalcium salt of neohesperidin dihydrochalcone with the monocalcium salt of naringin dihydrochalcone.

18. A method according to claim 11 wherein Formula (I) in (C), is the monosodium salt of neohesperidin dihydrochalcone.

19. A method according to claim 11 wherein Formula (I) in (C), is the monopotassium salt of naringin dihydrochalcone.

20. A method according to claim 13 wherein the sugarless chewing gum contains from about 0.1 to about 0.25 percent by weight of L-aspartyl-L-phenylalanine methyl ester, from about 0.5 to about 1.5 percent by weight of an oil of peppermint flavor and from about 0.01 to about 0.15 percent by weight of the monocalcium salt of neohesperidin dihydrochalcone as a flavor preserving and prolonging agent.

21. A sugarless candy composition having preserved flavor qualities comprises:
  A. From about 0 percent to about 0.2 percent by weight, based on the total weight of the formulation, of an artificial sweetener;
  B. From about 0.1 percent to about 1 percent by weight of a natural or synthetic essential oil flavor; and
  C. At least about 0.0025 percent by weight of at least one dihydrochalcone glycoside monosalt flavor preserving agent having the Formula (I):

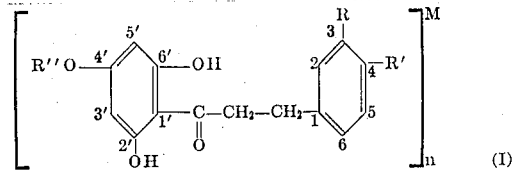

wherein R represents a radical selected from the group consisting of hydrogen and hydroxy; R' represents a radical selected from the group consisting of hydrogen, hydroxy and 1 to 3 carbon alkoxy; and R'' represents a glycoside residue selected from the group consisting of β-rutinosyl, neohesperidosyl and β-D-glucosyl; and M is a mono- or divalent metal selected from the group consisting of an alkali metal and an alkaline earth metal, and n is an integer from 1 to 2 corresponding to the valence of the selected metal M.

22. A composition according to claim 21 wherein from about 0.009 percent by weight to about 0.02 percent by weight of the artificial sweetener is present; from about 0.3 percent by weight to about 0.8 percent by weight of the natural or synthetic essential oil flavor is present; and from about 0.0025 percent by weight to about 0.5 percent by weight of at least one dihydrochalcone glycoside monosalt flavor preserving agent is present.

23. A composition according to claim 22 wherein from about 0.01 percent by weight to about 0.15 percent by weight of at least one dihydrochalcone glycoside monosalt flavor preserving agent is present.

24. A composition according to claim 21 wherein, in Formula (I), R represents a radical selected from the group consisting of hydrogen and hydroxy; R' represents a radical selected from the group consisting of hydroxy and 1 to 3 carbon alkoxy; and R'' represents a glycoside residue selected from the group consisting of neohesperidosyl and β-D-glucosyl.

25. A composition according to claim 21 wherein Formula (I) in (C), is the monocalcium salt of neohesperidin dihydrochalcone.

26. A composition according to claim 21 wherein Formula (I) in (C), is the monocalcium salt of naringin dihydrochalcone.

27. A composition according to claim 21 wherein Formula (I) in (C), is a combination of the monocalcium salt of neohesperidin dihydrochalcone with the monocalcium salt of naringin dihydrochalcone.

28. A composition according to claim 21 wherein Formula (I) in (C), is the monosodium salt of neohesperidin dihydrochalcone.

29. A composition according to claim 21 wherein Formula (I) in (C), is the monopotassium salt of naringin dihydrochalcone.

30. A composition according to claim 23 wherein the sugarless candy composition contains from about 0.009 to about 0.02 percent by weight of L-aspartyl-L-phenylalanine methyl ester; from about 0.3 to about 0.8 percent by weight of an oil of peppermint flavor; and from about 0.01 to about 0.15 percent by weight of the monocalcium salt of neohesperidin dihydrochalcone as a flavor preserving agent.

31. A method for preserving natural and synthetic essential oil flavors in sugarless candy compositions containing from about 0 to about 0.2 percent by weight, based on the weight of the total formulation, of an artificial sweetener, and from about 0.1 to about 1 percent by weight of natural or synthetic essential oil flavor, which comprises incorporating therein at least about 0.0025 percent by weight of at least one dihydrochalcone glycoside monosalt flavor preserving agent having the Formula (I):

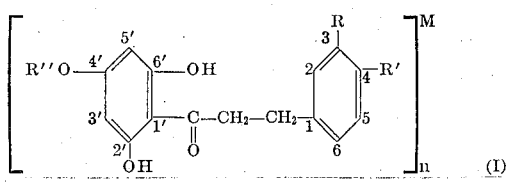

wherein R represents a radical selected from the group consisting of hydrogen and hydroxy; R' represents a radical selected from the group consisting of hydrogen, hydroxy and 1 to 3 carbon alkoxy; and R'' represents a glycoside residue selected from the group consisting of β-rutinosyl, neohesperidosyl and β-D-glucosyl; and M is a mono- or divalent metal selected from the group consisting of an alkali metal and an alkaline earth metal, and n is an integer from 1 to 2 corresponding to the valence of the selected metal M.

32. A method according to claim 31 wherein from about 0.009 percent by weight to about 0.02 percent by weight of the artificial sweetener is present; from about 0.3 percent by weight to about 0.8 percent by weight of the natural or synthetic essential oil flavor is present; and from about 0.0025% by weight to about 0.5 percent by weight of at least one dihydrochalcone glycoside monosalt flavor preserving agent is present.

33. A method according to claim 32 wherein from about 0.01 percent by weight to about 0.15 percent by weight of at least one dihydrochalcone glycoside monosalt flavor preserving agent is present.

34. A method according to claim 31 wherein, in Formula (I), R represents a radical selected from the group consisting of hydrogen and hydroxy; R' represents a radical selected from the group consisting of hydroxy and 1 to 3 carbon alkoxy; and R'' represents a glycoside residue selected from the group consisting of neohesperidosyl and β-D-glucosyl.

35. A method according to claim 31 wherein Formula (I) in (C), is the monocalcium salt of neohesperidin dihydrochalcone.

36. A method according to claim 31 wherein Formula (I) in (C), is the monocalcium salt of naringin dihydrochalcone.

37. A method according to claim 34 wherein Formula (I) in (C), is a combination of the monocalcium salt of neohesperidin dihydrochalcone with the monocalcium salt of naringin dihydrochalcone.

38. A method according to claim 31 wherein Formula (I) in (C), is the monosodium salt of neohesperidin dihydrochalcone.

39. A method according to claim 31 wherein Formula (I) in (C), is the monopotassium salt of naringin dihydrochalcone.

40. A method according to claim 33 wherein the sugarless candy composition contains from about 0.009 to about 0.02 percent by weight of L-aspartyl-L-phenylalanine methyl ester; from about 0.3 to about 0.8 percent by weight of an oil of peppermint flavor; and from about 0.01 to about 0.15 percent by weight of the monocalcium salt of neohesperidin dihydrochalcone as a flavor preserving agent.

* * * * *